US006758522B2

(12) United States Patent
Ligon, Sr. et al.

(10) Patent No.: US 6,758,522 B2
(45) Date of Patent: Jul. 6, 2004

(54) APPARATUS AND METHOD FOR VARYING COEFFICIENTS OF FRICTION IN A VARIABLE APEX BACK SUPPORT

(75) Inventors: James T. Ligon, Sr., Almont, MI (US); Stephen T. Porter, Almont, MI (US); James T. Ligon, Jr., Almont, MI (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/113,429

(22) Filed: Mar. 29, 2002

(65) Prior Publication Data

US 2003/0006636 A1 Jan. 9, 2003

Related U.S. Application Data

(60) Provisional application No. 60/279,786, filed on Mar. 29, 2001, and provisional application No. 60/312,869, filed on Aug. 16, 2001.

(51) Int. Cl.[7] .............................................. A47C 3/025
(52) U.S. Cl. .................................. 297/284.4; 297/284.1
(58) Field of Search .......................... 297/284.1, 284.2, 297/284.3, 284.4

(56) References Cited

U.S. PATENT DOCUMENTS

| | | | |
|---|---|---|---|
| 1,182,854 A | 5/1916 | Poler | |
| 2,756,809 A | 7/1956 | Endresen | 155/182 |
| 2,843,195 A | 7/1958 | Barvaeus | 155/182 |
| 2,942,651 A | 6/1960 | Binding | 155/131 |
| 3,378,299 A | 4/1968 | Sandor | 297/284 |
| 3,490,084 A | 1/1970 | Schuster | 5/351 |
| 3,492,768 A | 2/1970 | Schuster | 52/98 |
| 3,589,769 A * | 6/1971 | Bressler | 297/42 |
| 3,724,144 A | 4/1973 | Schuster | 52/108 |
| 3,762,769 A | 10/1973 | Poschl | 297/284 |
| 4,014,422 A | 3/1977 | Morishita | 192/67 |
| 4,136,577 A | 1/1979 | Borgersen | 74/479 |
| 4,153,293 A | 5/1979 | Sheldon | 297/284 |

(List continued on next page.)

FOREIGN PATENT DOCUMENTS

| | | | | |
|---|---|---|---|---|
| AT | 401 497 | 9/1996 | | B60N/2/22 |
| DE | 2040794 | 7/1971 | | A47C/7/28 |
| DE | 206 4419 | 7/1972 | | B60N/1/06 |
| DE | 29 47 472 | 8/1980 | | B60N/1/00 |
| EP | 0 006 840 B1 | 2/1982 | | A47C/23/00 |
| EP | 0 169 293 B1 | 10/1988 | | A47C/7/46 |
| EP | 0 322 535 A1 | 7/1989 | | A47C/7/46 |
| EP | 0 485 483 B1 | 1/1994 | | A47C/7/46 |
| EP | 0 434 660 B1 | 5/1995 | | A47C/7/46 |
| EP | 0 540 481 B1 | 12/1995 | | A47C/7/46 |
| EP | 0 662 795 B1 | 12/1996 | | A47C/7/46 |
| EP | 0 702 522 B1 | 3/1997 | | A47C/7/46 |
| EP | 0 696 251 B1 | 7/1997 | | B60N/2/44 |
| EP | 0 746 219 B1 | 11/1998 | | A47C/7/46 |
| EP | 0 797 399 B1 | 11/1998 | | A47C/7/46 |
| EP | 0 698 360 B1 | 3/2000 | | A47C/7/46 |
| FR | 2 596 334 | 10/1987 | | B60N/1/06 |
| GB | 1 423 617 | 2/1976 | | A47C/7/46 |
| GB | 2 013 487 | 2/1978 | | A47C/7/46 |
| RU | 587924 | 2/1978 | | A47C/7/46 |
| WO | WO/00/00064 | 1/2000 | | A47C/3/025 |

*Primary Examiner*—Peter M. Cuomo
*Assistant Examiner*—Erika Garrett
(74) *Attorney, Agent, or Firm*—Dennis JM Donahue, III; Grant D. Kang; Husch & Eppenberger, LLC

(57) ABSTRACT

A flexible back support for use in seats such as automobile seats or office chairs, includes a central body portion with outwardly extending support fingers such that an arch having a variable apex is formed when the back support is subtended longitudinally. The longitudinal location of an apex and the shape of the arch formed on the back support changes responsively to a load imposed by a person's back. Noise, galling, wear and rough movement between moving parts of the flexible back support are reduced by the coefficient of friction reduction method of the present invention.

41 Claims, 4 Drawing Sheets

U.S. PATENT DOCUMENTS

| | | |
|---|---|---|
| 4,156,544 A | 5/1979 | Swenson et al. ............ 297/284 |
| 4,182,533 A | 1/1980 | Arndt et al. ................ 297/284 |
| 4,295,681 A | 10/1981 | Gregory ..................... 297/284 |
| 4,313,637 A | 2/1982 | Barley ....................... 297/284 |
| 4,316,631 A | 2/1982 | Lenz et al. ................. 297/284 |
| 4,354,709 A | 10/1982 | Schuster ..................... 297/284 |
| 4,390,210 A | 6/1983 | Wisniewski et al. ........ 297/452 |
| 4,449,751 A | 5/1984 | Murphy et al. ............. 297/284 |
| 4,452,485 A | 6/1984 | Schuster ..................... 297/284 |
| 4,465,158 A * | 8/1984 | Yamazaki et al. .......... 180/271 |
| 4,465,317 A | 8/1984 | Schwarz ..................... 297/284 |
| 4,494,709 A | 1/1985 | Takada .................... 242/107.6 |
| 4,541,670 A | 9/1985 | Morgenstern et al. ...... 297/284 |
| 4,555,140 A | 11/1985 | Nemoto ..................... 297/452 |
| 4,556,251 A | 12/1985 | Takagi ....................... 297/284 |
| 4,561,606 A | 12/1985 | Sakakibara et al. ......... 242/107 |
| 4,564,235 A | 1/1986 | Hatsutta et al. ............. 297/284 |
| 4,565,406 A | 1/1986 | Suzuki ....................... 297/284 |
| 4,576,410 A | 3/1986 | Hattori ....................... 297/284 |
| 4,601,514 A | 7/1986 | Meiller ....................... 297/284 |
| 4,602,819 A | 7/1986 | Morel ........................ 297/460 |
| 4,627,661 A | 12/1986 | Ronnhult et al. ........... 297/284 |
| 4,632,454 A | 12/1986 | Naert ......................... 297/284 |
| 4,676,550 A | 6/1987 | Neve De Mevergnies .. 297/353 |
| 4,679,848 A | 7/1987 | Spierings ................... 297/284 |
| 4,730,871 A | 3/1988 | Sheldon ..................... 297/230 |
| 4,880,271 A | 11/1989 | Graves ....................... 257/284 |
| 4,909,568 A | 3/1990 | Dal Monte ................. 292/284 |
| 4,915,448 A | 4/1990 | Morgenstern ............... 297/284 |
| 4,950,032 A | 8/1990 | Nagasaka ................... 297/284 |
| 4,957,102 A | 9/1990 | Tan et al. ..................... 128/68 |
| 4,968,093 A | 11/1990 | Dal Monte ................. 297/284 |
| 5,005,904 A | 4/1991 | Clemens et al. ............ 297/284 |
| 5,022,709 A | 6/1991 | Marchino ................... 297/452 |
| 5,026,116 A | 6/1991 | Dal Monte ................. 297/284 |
| 5,050,930 A | 9/1991 | Schuster et al. ............ 257/284 |
| 5,076,643 A | 12/1991 | Colasanti et al. ........... 297/284 |
| 5,088,790 A | 2/1992 | Wainwright et al. ........ 297/284 |
| 5,137,329 A | 8/1992 | Neale ......................... 297/284 |
| 5,174,526 A | 12/1992 | Kanigowski ................ 244/122 |
| 5,186,412 A | 2/1993 | Park .......................... 242/245 |
| 5,197,780 A | 3/1993 | Coughlin ................. 297/284.7 |
| 5,215,350 A | 6/1993 | Kato ....................... 297/284.4 |
| 5,217,278 A | 6/1993 | Harrison et al. .......... 297/284.7 |
| 5,286,087 A | 2/1994 | Elton ...................... 297/284.7 |
| 5,299,851 A | 4/1994 | Lin ......................... 297/284.5 |
| 5,335,965 A | 8/1994 | Sessini ..................... 297/284.4 |
| 5,385,531 A | 1/1995 | Jover ........................ 601/99 |
| 5,397,164 A | 3/1995 | Schuster et al. ......... 297/284.1 |
| 5,423,593 A | 6/1995 | Nagashima .............. 297/284.5 |
| 5,449,219 A | 9/1995 | Hay et al. ................ 297/284.4 |
| 5,452,868 A | 9/1995 | Kanigowski ............ 244/122 R |
| 5,474,358 A * | 12/1995 | Maeyaert ................. 297/284.7 |
| 5,498,063 A | 3/1996 | Schuster et al. .......... 297/284.1 |
| 5,518,294 A | 5/1996 | Ligon, Sr. et al. ....... 297/284.4 |
| 5,553,917 A | 9/1996 | Adat et al. ............. 297/230.14 |
| 5,562,324 A | 10/1996 | Massara et al. .......... 297/284.6 |
| 5,567,010 A | 10/1996 | Sparks .................... 297/284.4 |
| 5,567,011 A | 10/1996 | Sessini ..................... 297/284.4 |
| 5,588,703 A | 12/1996 | Itou ......................... 297/284.4 |
| 5,609,394 A | 3/1997 | Ligon, Sr. et al. ....... 297/284.4 |
| 5,626,390 A | 5/1997 | Schuster ................. 297/284.1 |
| 5,638,722 A | 6/1997 | Klingler ..................... 74/502.4 |
| 5,651,583 A | 7/1997 | Klingler et al. .......... 297/284.4 |
| 5,651,584 A | 7/1997 | Chenot et al. ........... 297/284.4 |
| 5,704,687 A | 1/1998 | Klingler .................. 297/284.4 |
| 5,718,476 A | 2/1998 | De Pascal et al. ....... 297/284.4 |
| 5,758,925 A | 6/1998 | Schrewe et al. ......... 297/284.6 |
| 5,762,397 A | 6/1998 | Venuto et al. ........... 297/284.4 |
| 5,769,491 A | 6/1998 | Schwarzbich ............ 297/284.4 |
| 5,772,281 A | 6/1998 | Massara ................... 297/284.4 |
| 5,775,773 A | 7/1998 | Schuster et al. .......... 297/284.1 |
| 5,791,733 A | 8/1998 | van Hekken et al. .... 297/284.4 |
| 5,816,653 A | 10/1998 | Benson .................... 297/284.4 |
| 5,823,620 A | 10/1998 | Le Caz .................... 297/284.4 |
| 5,857,743 A | 1/1999 | Ligon, Sr. et al. ....... 297/284.9 |
| 5,868,466 A | 2/1999 | Massara et al. .......... 297/284.6 |
| 5,873,628 A * | 2/1999 | Allard et al. ............... 297/326 |
| 5,884,968 A | 3/1999 | Massara ................ 297/216.12 |
| 5,897,168 A | 4/1999 | Bartelt et al. .......... 297/452.18 |
| 5,911,477 A | 6/1999 | Mundell et al. ......... 297/284.4 |
| 5,913,569 A | 6/1999 | Klingler .................. 297/284.4 |
| 5,934,752 A | 8/1999 | Klingler .................. 297/284.4 |
| 5,975,632 A | 11/1999 | Ginat ...................... 297/284.4 |
| 5,984,407 A | 11/1999 | Ligon, Sr. et al. ....... 297/284.4 |
| 5,988,745 A | 11/1999 | Deceuninck ............. 297/284.4 |
| 6,003,941 A | 12/1999 | Schuster, Sr. et al. ... 297/284.1 |
| 6,007,151 A | 12/1999 | Benson .................... 297/284.4 |
| 6,030,041 A | 2/2000 | Hsiao ...................... 297/284.4 |
| 6,036,265 A | 3/2000 | Cosentino ............... 297/284.4 |
| 6,045,185 A | 4/2000 | Ligon, Sr. et al. ....... 297/284.4 |
| 6,050,641 A | 4/2000 | Benson .................... 297/284.4 |
| 6,079,783 A | 6/2000 | Schuster, Sr. et al. ... 297/284.4 |
| 6,092,871 A | 7/2000 | Beaulieu ................. 297/284.4 |
| 6,152,531 A | 11/2000 | Deceuninck ............. 297/284.4 |
| 6,152,532 A | 11/2000 | Cosentino ............... 297/284.4 |
| 6,158,300 A | 12/2000 | Klingler ..................... 74/526 |
| 6,227,617 B1 | 5/2001 | von Moller .............. 297/284.4 |
| 6,227,618 B1 | 5/2001 | Ligon, Sr. et al. ....... 297/284.4 |
| 6,254,186 B1 | 7/2001 | Falzon ....................... 297/284 |
| 6,254,187 B1 | 7/2001 | Schuster, Sr. et al. ... 297/284.1 |
| 6,270,158 B1 | 8/2001 | Hong ....................... 297/284.4 |
| 6,296,308 B1 | 10/2001 | Cosentino et al. ....... 297/284.4 |
| 6,334,651 B1 | 1/2002 | Duan et al. .............. 297/284.4 |
| 2003/0085599 A1 * | 5/2003 | McMillen ................ 297/284.4 |

* cited by examiner

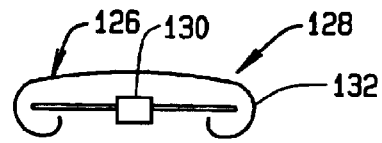
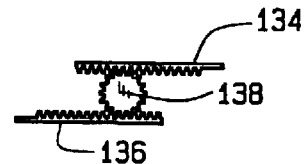
FIG. 7A  FIG. 7B  FIG. 7C
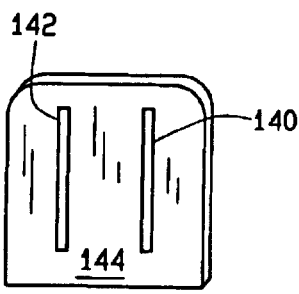
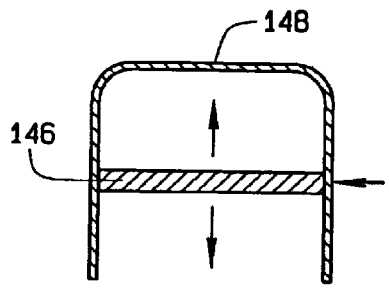
FIG. 8  FIG. 9A
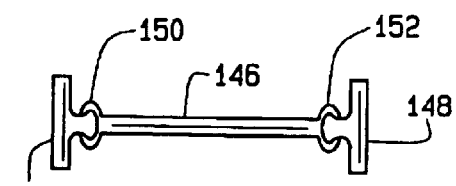
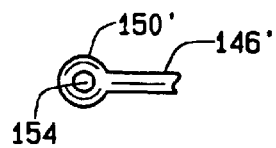
FIG. 9B  FIG. 9C
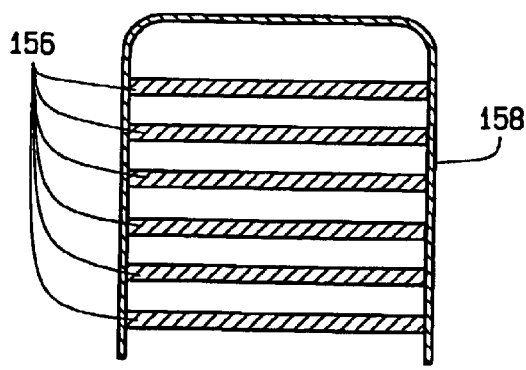
FIG. 10

APPARATUS AND METHOD FOR VARYING COEFFICIENTS OF FRICTION IN A VARIABLE APEX BACK SUPPORT

CROSS-REFERENCE TO RELATED APPLICATIONS

This application claims priority under 35 U.S.C. Sec. 119(e) to provisional application No. 60/279,786 filed Mar. 29, 2001 and to provisional application No. 60/312,869 filed Aug. 16, 2001.

STATEMENT REGARDING FEDERALLY SPONSORED RESEARCH OF DEVELOPMENT

Not applicable.

FIELD OF THE INVENTION

The present invention relates to back supports and more particularly to back supports used in seatbacks.

BACKGROUND OF THE INVENTION

A variety of seat back support devices provide added support and comfort to a person's back. These devices are especially common in vehicle seats or office chairs as lumbar supports. Such devices are described in U.S. Pat. Nos. 5,518,294; 6,296,308 B1; 5,397,164; 6,036,265; 6,254,187; 6,227,618; 6,158,300; 6,152,532; 6,050,641; 6,036,265; 6,007,151; 5,816,653; 5,681,005; and 5,609,394, the teachings of which are hereby expressly incorporated by reference herein. For all such devices, reducing noise, wear and promoting smooth functional interaction of the moving parts of such back supports is a continuing need.

SUMMARY OF THE INVENTION

This lumbar support invention provides a unitary flexible support member formed from a sheet of material. The support member arches outwardly to support a person's back. The support member preferably has a central body portion with a longitudinal axis and opposite ends at each end of the axis. Typically, a number of support fingers extend outwardly from the central body portion in a generally horizontal direction. A means for arching the support member is attached to the support member to arch the support member outwardly to support a person's back.

The flexible support member must be mounted in the frame of a seat. One conventional mounting method is with guide wires which are usually vertical and run through mounting slots in either longitudinal end of the flexible support member. Another conventional mounting method is with horizontal bars that are pivotably, rotatably or slidingly mounted to either longitudinal end of the flexible support member. According to the present invention, Either the support member, bars, wires or like structure upon which it is mounted, or both, have their coefficient of friction reduced to quiet, smooth and reduce wear in their interaction.

Reducing the coefficient of friction is achieved by selectively coating portions of the assembly with a low friction material, surface smoothing, such as by a vibratory technique, by interposing friction reducing elements such as plastic members or tape, or by lubricating, such as with oils.

The means for arching the support member, for example a traction cable, may also benefit from reducing the coefficient of friction between it and the flexible support member.

The support fingers and front of the flexible support surface may also be surface smoothed, such as by a vibratory technique. This reduces wear on the seat cushions. The result is a relatively low cost improved support member for use in a back support device.

Further features and advantages of the present invention, as well as the structure and operation of various embodiments of the present invention, are described in detail below with reference to the accompanying drawings.

BRIEF DESCRIPTION OF THE DRAWINGS

FIGS. 7a–c is a side view showing another alternative approach to actuation.

FIG. 8 illustrates a perspective view of a seat back insert for facilitating back support actuation.

FIGS. 9a–c illustrate an embodiment including a translatable member for providing adjustable support.

FIG. 10 illustrates another embodiment including plural tensionable members for local support.

DETAILED DESCRIPTION OF THE INVENTION

The subject of the invention is an improvement to lumbar supports such as are described in U.S. Pat. Nos. 5,518,294; 6,296,308 B1; 5,397,164; 6,036,265; 6,254,187; 6,227,618; 6,158,300; 6,152,532; 6,050,641; 6,036,265; 6,007,151; 5,816,653; 5,681,005; and 5,609,394, which are hereby incorporated by reference for all purposes.

Figure 1:
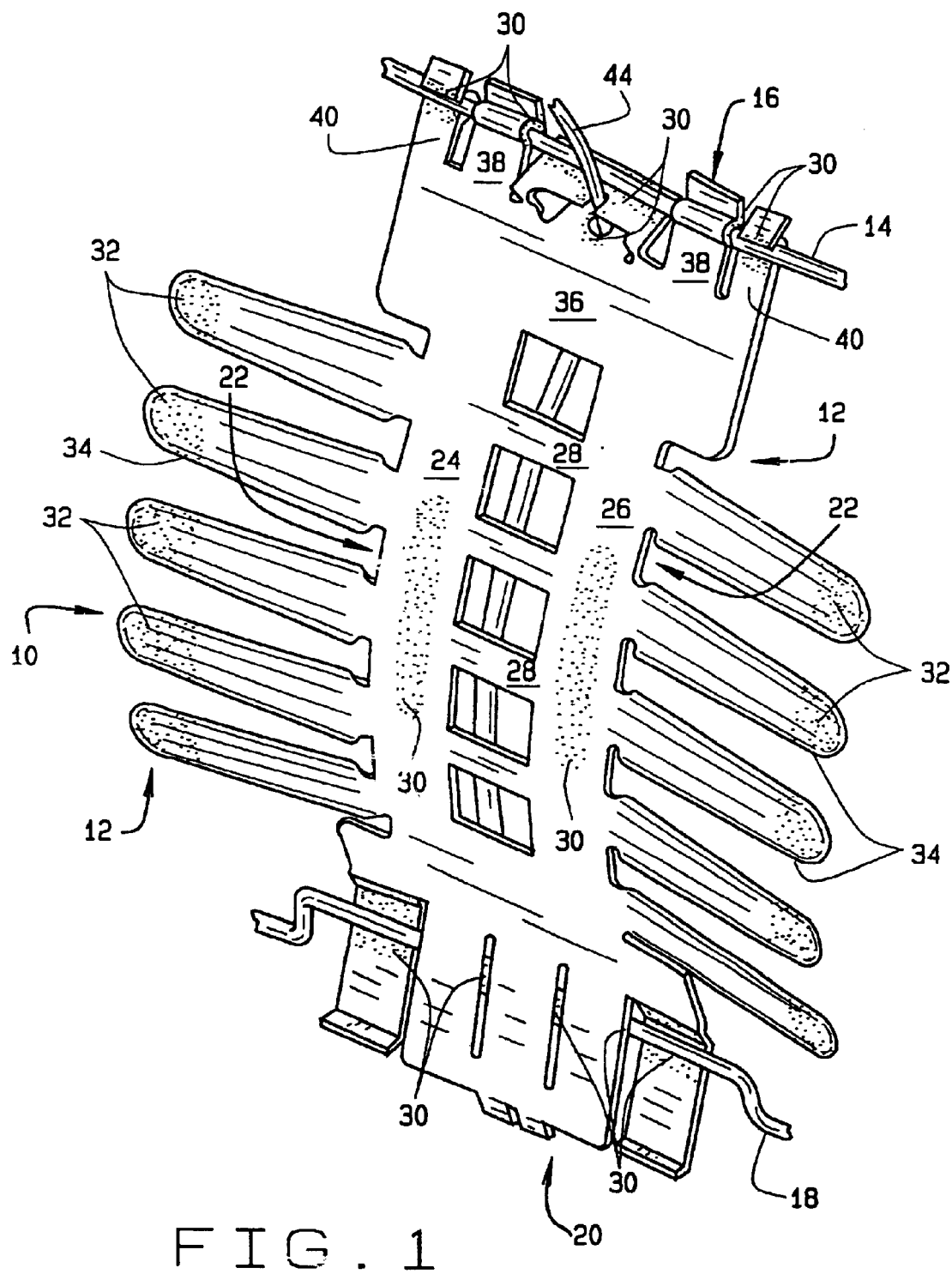
FIG. 1 is a front perspective view of an embodiment of the inventive back support.
Figure 2:
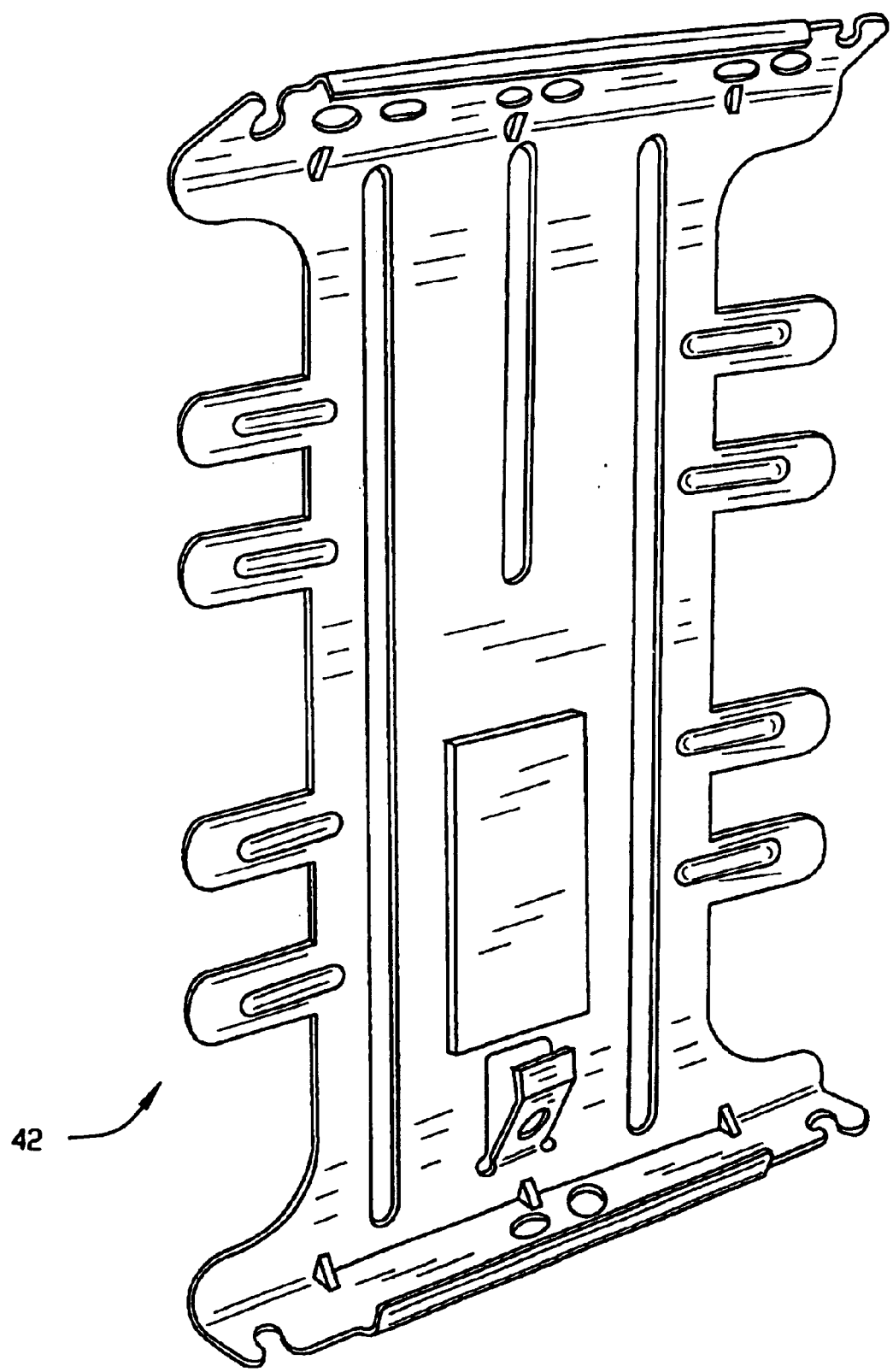
FIG. 2 is a perspective view of another embodiment of the inventive back support.

Referring to the accompanying drawings in which like reference numbers indicate like elements, FIG. 1 is a front perspective view of one preferred embodiment 10 of a back support designed in accordance with this invention. A support member 12 is mounted in a conventional seatback upon a first bar 14 (e.g., a wire or like member, which is generally vertically or horizontally oriented) at a first longitudinal end 16 of the support member 12. An optional second bar 18 is positioned near the second longitudinal end 20 of single-piece support member 12 such that the mounting portion near the second longitudinal end 20 provides a pivotal and movable mount upon or about bar 18. In the embodiment depicted in FIG. 1, Bars 14 and 18 are preferably horizontally disposed within a seatback frame as generally shown in FIG. 2. The details of the mounting and movement of the single-piece support member 12 upon bars 14 and 18 are provided in U.S. Pat. No. 5,518,294.

Support member 12 includes a central body 22 that may further include longitudinal strips 24 and 26. Transverse strips 28 may also be provided between longitudinal strips 24 and 26 to provide greater comfort to a user and to provide more integrity and stability to support member 12. In one embodiment the support member is a single piece. In another embodiment, the support member 12 is preferably formed of a single stamping of an alloy metal known as Martinsite®. The lightweight and durable nature of support member 12 may be further enhanced by providing transverse strips 28 between longitudinal strips 24 and 26 rather than providing a solid member as central body 22. As discussed in further detail, rather than powder coating or otherwise coating the entire support member 12 (which will typically be a stamping), improved results are possible by selectively treating the stamping with a coating 30 to impart a protective surface, a low friction surface or both over only a portion of the member 12.

Extending outward from central body 22 are support fingers 32. Support fingers 32 may be coplanar with or angled relative to a plane defined by central body 22. The angle of support fingers 32 may be selected to yield greater lateral support for a user and to enhance the comfort provided by the inventive back support. The peripheral edges 34 of support fingers 32 may be flat or bent back slightly relative to the forward projection of the support fingers 32. Preferably the edges 34 (or optionally other edges of the member 12) are surface smoothed to avoid sharp edges, burrs or the like. One preferred approach is to vibratory smooth the edges such as by vibratory burnishing.

It is to be understood that the references within this description to the top or bottom of the support member are relative to the mounting of the illustrated preferred embodiment. The items described may be inverted and still fall within the present invention.

First plate 36 includes suitable mounting structure (e.g., clamping members 38 and 40, other gripping members, or the like) for mounting the first longitudinal end 16 of support member 12 on bar 14. When employed, clamping members 38 and 40 provide an easy installation of the support member 12 because clamping members 38 and 40 effectively "snap on" bar 14 as the support member is moved generally upward against bar 14. The mounting provided by clamping members 38 and 40 enables efficient assembly requiring a minimum amount of tools and a minimum amount of parts.

The actuation mechanism and other operational features of the present device can be gleaned from U.S. Pat. No. 5,518,294, which is hereby incorporated by reference. In one embodiment, as shown in FIG. 1, the two ends of the lumbar support member are supported by two bars (or wires) that are part of the seat back. There is relative motion between the wires and the stamped element, primarily rotation at one end, and sliding at the other end. In order to prevent noise and galling of the wires, a lubricating material or a suitable plastic material sleeve or coating is used at the interface between the wires and the member 12. For instance, the material used may be a powder coat, or a liquid coating applied by a spray process, wherein the coating is baked to dry out the solvents and cure the resin. The same process may be applied to either guide wires or mounting bars instead of the flexible support member or in addition to it.

In another embodiment, at least a portion of the wire or bar is treated to have a low friction surface. For example, the wire may be treated by extruding the wire with a low friction plastic. For instance, the wire might be treated by cross head extruding it with a plastic. Alternatively, the wire may be treated by placing or pressing an extruded plastic tube over said wire.

By way of illustration of the techniques for treating the member 12, the following are disclosed. In one example, a suitable tape is fabricated of a layer of low friction plastic (e.g., ultra high molecular weight polyethylene (UHMWPE), ultrahigh density polyethylene, or the low friction materials disclosed elsewhere herein) with a suitable adhesive (e.g., an acrylic pressure sensitive adhesive). The tape is applied to the member at the areas that are in contact with the seat back wire or where there is contemplated to be sliding contact between two parts under pressure as for example the Bowden traction cable depicted in FIG. 44. As mentioned a number of materials are suitable for the function described above. In general, the materials will exhibit a relatively high sliding abrasion resistance, a relatively high notched impact resistance, a relatively low coefficient of friction for on-stick, self lubricated surfaces, relatively good toughness and ductility from −452° to +194° F., relatively high noise reduction and shock absorption, and relatively good dimensional stability.

In another embodiment, in lieu of or in combination with a tape, a lubricant (e.g., a grease or an oil) is employed over at least a portion of the member. By way of illustration, one suitable lubricant is or has the characteristics of Krytox® oil (available from DuPont). Such characteristics are summarized in Table A. For example, P.F.P.E. (k) (Krytox) oil with a viscosity index of about 124 and a useful temperature range of about −60° F. to +355° F. would provide the necessary lubricity to pass our screening.

In yet another illustrative embodiment, a laminated tape is employed having performance characteristics of the tapes disclosed in Table B. For example a plastic/metal foil tape might be employed, having an adhesive for bonding on one of its surfaces. By way of illustration, a tape may be used having on the order of about 0.002 inch thick metal (e.g. aluminum), which has a pressure sensitive adhesive on one surface, and a plastic (e.g., PTFE or Teflon®) layer on the order of about 0.001 inch thick on the other metal surface. It is believed that this provides sufficient lubricity and toughness to withstand the sliding contact with the seat back wire. Of course, as mentioned above, the above techniques can be used in lieu of or in combination with treating the bars. Table C illustrates a range of characteristics for suitable UHMWPE materials.

FIG. 2 illustrates an alterative support member 42 for mounting on vertically oriented bars or wires, for which the present invention may have like utility. In this regard, the inventive aspects described herein find utility with support members of the type disclosed in other seat back devices including but not limited to those described in U.S. Pat. No. 6,158,300 (Klingler); U.S. Pat. No. 5,397,164 (Schuster); U.S. Pat. No. 6,296,308 B1 (Costentino); U.S. Pat. No. 6,050,641 (Benson); U.S. Pat. No. 6,152,532 (Cosentino); U.S. Pat. No. 6,036,265 (Cosentino); U.S. Pat. No. 6,007,151 (Benson); U.S. Pat. No. 5,816,653 (Benson), the teachings of which are hereby expressly incorporated by reference herein.

The exact materials of Tables A–C (hereby incorporated by reference) need not be employed to be within the scope of the present invention. Other coatings might include powder coatings (e.g. graphite powder coatings), or the like. Further, some or all of the coating locations shown in FIG. 1 may be omitted (e.g. over the strips 26,28 the fingers or elsewhere), or coatings may be employed elsewhere over the member surface or over all of it. However, it is preferred that materials employed exhibit relatively comparable performance in the relevant properties.

Though it is appreciated that the present invention also contemplate that an entire part is coated, overall, it is preferred that a substantial portion of the member 12 be free of a coating (which encompasses traditional coatings as well as tapes, films or the like) in accordance with the present invention, and that any such coatings employed are selectively employed over wear or contact surfaces. The one preferred embodiment, no more than about 50% of the member surface is coated. In other embodiment, no more than about 30% of the member surface is coated. In another embodiment, no more than about 15% of the member surface is coated. In another embodiment, no more than about 10% of the member surface is coated. Further, it is preferred that the thickness of any such coating is less than about 0.1 inch, more preferably less than about 0.05 inch, and more preferably less than about 0.01 inch, and more preferably is about 0.005 inch.

Resulting articles in accordance with the present invention exhibit excellent, consistent and reproducible performance over a broad range of temperatures from at least about −40° F. to 180° F.

Figure 3:
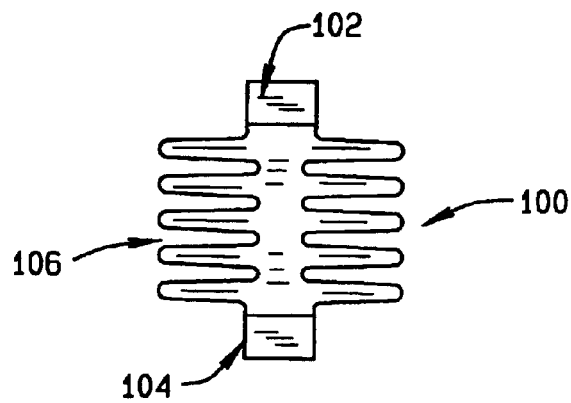
FIG. 3 is an elevational view of another back support embodiment.

Turning now to another aspect of the present invention, as shown in FIG. 3, in one embodiment, the support member 100 has a first end portion 102 and a second end portion 104 and includes an intermediate central body portion 106 that is fabricated from a first material, which is preferably flexible, or is a rigid material that is fabricated to be flexible (e.g., with suitable corrugations or variable section thicknesses at desired hinge points). The first end portion or both are adapted for coupling the support member 100 to a seat.

Figure 4:
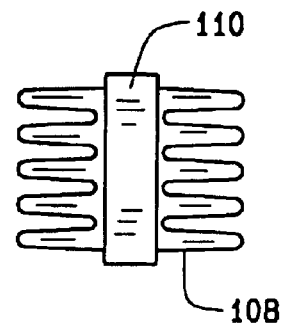
FIG. 4 is an elevational view of yet another back support embodiment.

As will be appreciated, the central body portion 106 preferably includes a plurality of extending fingers, which may be the same or a different material as the balance of the material of the central body portion. Thus, as shown in FIG. 4, the central body portion 106 might have plastic fingers 108, with metal elsewhere (e.g., as a metal spine 110), or vice versa. The plastic fingers might be insert molded onto the metal spine or attached in a subsequent operation, e.g., by placing over metal fingers (or protrusions for receiving the plastic fingers), by a coating process, or the like.

In a preferred approach, the central body portion is a metal, such as a sheet spring metal, and the attachment portion is made of a molded plastic. In this manner, advantageously, the attachment portion may be provided as a self-lubricating material, or a material otherwise having a relatively low coefficient of friction. In turn, this permits for the elimination of the need for low friction sleeves or applying lubrication to contact surfaces, such as where the attachment portion is to move along guide wires in the seat back. Also, it is possible to fabricate intricately shaped attachment portion structures, e.g., including integrated sliding surfaces, and structures that permit for the performance of multiple functions within the seat. For instance, an attachment portion might have molded cable or wire guides for routing of cables, wires, conduits or the like within. It might include frames or supports for actuators, controls, electronics, or other components packaged within the seat. Likewise, fingers or other structure in the support member may be adapted for performing multiple functions, such as affording heating or cooling paths, or receiving suitable piezoelectric devices or other electromagnetic devices for providing a vibration source.

It is contemplated that the support member might have sheet metal in face to face contact with some or all of at least one surface of the plastic attachment portions. Alternatively, the metal portion of the support member might adjoin the plastic attachment portions at the respective ends thereof. Combinations of the two might also be employed.

Figure 5:
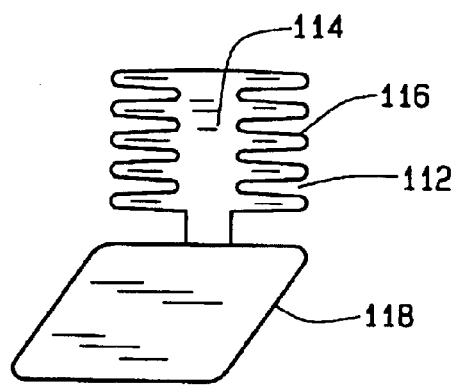
FIG. 5 is a perspective view of another embodiment showing a back support attached to a seat base frame.

In one embodiment, as shown in FIG. 5, a molded plastic, stamped metal or other suitable fabricated material is configured for defining a cantilever support member 112 including a central body portion 114, support fingers 116 or other support structure. The support member, in turn, is adapted for attachment to a seat, either to a frame member in the seat back (not shown), or to a base 118 of a seat, e.g., to a member inserted in the base, to a seat pan, a seat cushion frame, to a seat track attachment, or otherwise. Optionally, for an embodiment as shown in FIG. 5, the support member is hinged for pivotal rotation along with an adjustable seat back. The interaction of moving parts in this embodiment benefits from lower coefficients of friction achieved according to the method and apparatus of the present invention.

Using this type of approach, or any of the above approaches in which a molded plastic component is fabricated as part of the support member, it again is possible to increase the functionality of the back support device. For example, one embodiment contemplates the formation of a suitable molded fixture that is adapted to receive or house other vehicle components such as a thermoelectric device for heating or cooling the seat, electronics, sensors, air bag components, controls, actuators or the like.

Figure 6A:
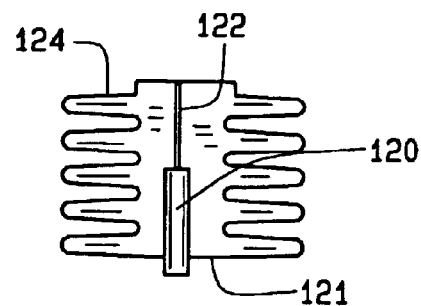
FIG. 6a is an elevational view of the configuration illustrated in FIGS. 6b–6c.
Figure 6B:
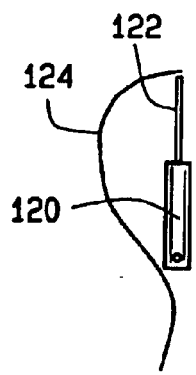
FIGS. 6b–6c are side views showing an alternative approach for actuating a back support.
Figure 6C:
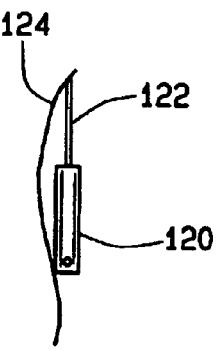

Turning to FIGS. 6a–6c, the present invention also contemplates the variation of conventional packaging designs for back rest actuators. Thus, as an alternative to laterally spaced motors for driving or relieving arching of the central body portion, a single actuator 120 may be pivotally secured to a seat or a support arm such as a pivot bar 121 (e.g., shown in FIG. 6a). The actuator is equipped with an arm or push rod 122, cable or the like, for driving one end of a support member 124 (shown in FIG. 6a in phantom) relative to the other, such as for arching or releasing an arch of the central body portion. In this manner, increased flexibility is possible from the use of a cantilevered support member. The interaction of moving parts in this embodiment benefits from lower coefficients of friction achieved according to the method and apparatus of the present invention.

It should be appreciated also that this longitudinally aligned actuator packaging is not limited to cantilevered structures, but can be used for support members that are attachable at both of their respective ends to the vehicle seat assembly. For example, per FIG. 7, one type of longitudinally aligned actuator 130 might be disposed intermediate of the two end portions 126, 128 of a support member 132. All actuators may be either manual or motor driven. The actuator preferably has at least two arms 134, 136 that are translatable relative to each other. For instance, in FIG. 7c the arms 134 and 136 are spaced about a rotatable sprocket 138 for extending or retracting them. Other like configurations are also possible. The interaction of moving parts in this embodiment benefits from lower coefficients of friction achieved according to the method and apparatus of the present invention.

FIG. 8 illustrates another option for facilitating actuation of a support member. In this option, a seat back insert plate 140 or like structure is provided. The insert 140 has at least one guide track 142 (elevated or recessed) relative to a surface 144 of the insert. The track can be self lubricating, e.g., by selection of the material (e.g., PTFE, polyethylene, or the like) or a lubricant can be applied to it, such as an oil, graphite, the lubricants discussed previously, or the like. The interaction of moving parts in this embodiment benefits from lower coefficients of friction achieved according to the method and apparatus of the present invention.

The concepts of the present invention also contemplate the relocation of various functions of the assemblies discussed previously to other places within the seat, in order to help simplify assembly operations, reduce parts or otherwise improve assembly manufacture. By way of example, turning to FIG. 9, the present invention contemplates that the support member need not include fingers or flex for bowing. A support member 146 (such as a manually or motor driven translatable bar, web, molded plastic structure, or the like) is adapted to be translated along a guide frame 148 or other suitable guide surface. For instance the support member 146 might be configured with ends 150, 152 for gripping (e.g., frictionally, clamping, snapping or the like) a nub formed on the frame, as seen from the sectional view of FIG. 9. Or a support member 146 might simply have an end (e.g., the above partially opened end of FIG. 9b or the enclosed end 150 of FIG. 9c) adapted to run along a guide wire or rod 154 as in FIG. 9c. The guide surface on the guide frame might have differing profiles or thicknesses that vary along the length for directing the support member. To help secure the support member along the guide surface, the system may include notches or cut outs on the guide surface, the support member or both, for a ratchet and pawl locking adjustment. It may likewise have a screw down attachment, such as for clamping, employ locking pins, or the like. The interaction of moving parts in this embodiment benefits from lower coefficients of friction achieved according to the method and apparatus of the present invention.

The function of the adjustable support fingers can also be re-located elsewhere within the seat, such to the upholstery, the padding, suitable webbing, or the like, either in, on or adjacent the front of the seat, the back of the seat, or both. In another embodiment (shown in FIG. 10), a plurality of individually tensionable webs, straps or wires 156 are disposed across a frame 158. When tension is applied to one of the webs 156, it becomes tight and applies increased local pressure toward the back of a user. The interaction of moving parts in this embodiment benefits from lower coefficients of friction achieved according to the method and apparatus of the present invention.

The present invention also may be used in combination with other comfort and convenience features for a seat, such as side supports, thigh supports, recliners, pressure equalization bladders, or the like.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and method herein described and illustrated without departing from the scope of the invention, it is intended that all matter contained in the foregoing description or shown in the accompanying drawings shall be interpreted as illustrative rather than limiting. For example, the apparatus and method of the present invention may be used on plastic flexible support members, or between the flexible support members and traction means. Thus, the breadth and scope of the present invention should not be limited by any of the above-described exemplary embodiments, but should be defined only in accordance with the following claims appended hereto and their equivalents.

What is claimed is:

1. A back support for use within a seatback, comprising:
   a flexible support member having a longitudinal axis and first and second longitudinal ends;
   at least one of said first longitudinal end and said second longitudinal end being relatively displaceable within said seatback;
   mounts on at least one of said first and second longitudinal ends, said mounts being configured to be in moving communication with attachment elements that attach said flexible support member to said seatback such that said first longitudinal end and said second longitudinal end are relatively displaceable;
   said moving communication of said mounts with said attachment elements having a selectively varying coefficient of friction.

2. The back support of claim 1 wherein said selectively varying coefficient of friction at said moving communication of said mounts and said attachment elements is by coating at least a portion of said flexible support member.

3. The back support of claim 1 wherein said attachment elements are substantially horizontal bars.

4. The back support of claim 1 wherein said attachment elements are substantially vertical guide wires.

5. The back support of claim 3 wherein said selective varying of the coefficient of friction at said moving communication of said mounts and said bars is by coating at least a portion of said bars.

6. The back support of claim 4 wherein said selective varying of the coefficient of friction at said moving communication of said mounts and said guide wires is by coating at least a portion of said guide wires.

7. The back support of claim 1 wherein said flexible support member is metal.

8. The back support of claim 1 wherein said selective varying of the coefficient of friction is by coating any portion of said flexible support member.

9. The back support of claim 1 wherein said selective varying of the coefficient of friction is by a vibratory material removal process over any portion of said flexible support member.

10. The back support of claim 9 wherein said vibratory removal process is a burnishing process.

11. The back support of claim 2 wherein said coated portion includes a layer of adhesive in bonding contact with a low friction plastic.

12. The back support of claim 11 wherein said low friction plastic is PTFE.

13. The back support of claim 11 wherein said low friction plastic is ultra high molecular weight polyethylene.

14. The back support of claim 1 wherein said selectively varying coefficient of friction at said moving communication of said mounts and said attachment elements is by lubricating at least a portion of said flexible support member.

15. The back support of claim 14 wherein said lubricant has properties that correspond with the oil grades provided by DuPont under the name Krytox®.

16. The apparatus of claim 2 wherein said coated portion includes a lubricant.

17. The back support of claim 1 wherein said selectively varying coefficient of friction at said moving communication of said mounts and said attachment elements is by interposing a plastic element between said flexible support member and said attachment elements.

18. The back support of claim 17 wherein said plastic element is an extruded plastic tube over said attachment elements.

19. The back support of claim 18 wherein said attachment elements are treated by cross head extruding a wire with a plastic.

20. The back support of claim 1 wherein said selectively varying coefficient of friction at said moving communication of said mounts and said attachment elements is by interposing tape between said flexible support member and said attachment elements.

21. The back support of claim 20 wherein said tape further comprises a layer of metal.

22. The back support of claim 20 wherein said tape further comprises a layer of metal foil.

23. The back support of claim 20 wherein said tape further comprises a layer of aluminum foil.

24. The seat of claim 7 wherein said flexible support member comprises a single-stamped piece of low carbon, alloy-free, pretempered cold rolled steel.

25. The back support of claim 7 further comprising a plurality of support fingers extending outwardly from said longitudinal axis of said flexible support member, said support fingers having rounded ends distal from said flexible support member, and having folded perimeters, said folded perimeters being bent toward a back of said seatback.

26. The back support of claim 1 wherein said selective varying of the coefficient of friction is by a vibratory material removal process and a coating over any portion of said flexible support member.

27. The back support of claim 1 further comprising means for relatively displacing said first longitudinal end and said second longitudinal end of said flexible support member.

28. The back support of claim 27 wherein said means is a Bowden cable.

29. The back support of claim 28 wherein a plastic element is interposed between said flexible support member and said Bowden cable.

30. The back support of claim 28 wherein tape is interposed between said flexible support member and said Bowden cable.

31. An ergonomic support comprising:
a first and a second horizontal bar, each adapted for mounting on a seat frame;
a single-piece flexible support member having two ends, a first longitudinal end having a clamping member rotatably attaching said first end to said first horizontal bar and a second end having a holding member pivotably and slideably attaching said second end to said second bar such that said holding member pivots about and relative to an axis of said second horizontal bar;
a traction element attached to said support member substantially proximate to said ends, for longitudinally subtending said support member, whereby said support member arches outwardly to support a user's back; and
said flexible support member being treated over a portion of its surface for selectively varying the coefficient of friction at said portions.

32. The ergonomic support of claim 31 wherein said treatment is a vibratory removal process.

33. The ergonomic support of claim 31 wherein treatment is a coating with PTFE.

34. The ergonomic support of claim 31 wherein said treatment is a coating with UHMW Polyethylene.

35. The ergonomic support of claim 1 wherein said treated portion of said flexible support member is a portion of an outer surface of said flexible support member, said portion of said outer surface being disposed to contact a cushion of a seat where said ergonomic support is installed.

36. The ergonomic support of claim 31 wherein said treated portion of said flexible support member is on said clamping member where said clamping member contacts said first horizontal bar.

37. The ergonomic support of claim 31 wherein said treated portion of said flexible support member is on said holding member where said holding member contacts said second horizontal bar.

38. The ergonomic support of claim 31 wherein said treatment is by applying tape.

39. The ergonomic support of claim 38 wherein said tape includes a layer comprised of PTFE.

40. The ergonomic support of claims wherein said tape includes a layer comprised of UHMWPE.

41. The ergonomic support of claim wherein said flexible pressure surface is stamped metal.

\* \* \* \* \*